United States Patent
Fenton et al.

(10) Patent No.: US 9,161,113 B1
(45) Date of Patent: Oct. 13, 2015

(54) TRANSPARENT LENS MICROPHONE

(71) Applicants: Elvin Fenton, Texarkana, TX (US); O. Wendell McCracken, Pauls Valley, OK (US)

(72) Inventors: Elvin Fenton, Texarkana, TX (US); O. Wendell McCracken, Pauls Valley, OK (US)

( * ) Notice: Subject to any disclaimer, the term of this patent is extended or adjusted under 35 U.S.C. 154(b) by 317 days.

(21) Appl. No.: 13/768,894

(22) Filed: Feb. 15, 2013

Related U.S. Application Data

(60) Provisional application No. 61/600,236, filed on Feb. 17, 2012, provisional application No. 61/624,585, filed on Apr. 16, 2012.

(51) Int. Cl.
*H04R 1/02* (2006.01)
*H04R 1/08* (2006.01)

(52) U.S. Cl.
CPC ........................................ *H04R 1/08* (2013.01)

(58) Field of Classification Search
None
See application file for complete search history.

(56) References Cited

U.S. PATENT DOCUMENTS

| | | | |
|---|---|---|---|
| 3,770,911 A | 11/1973 | Knowles et al. | |
| 3,789,163 A | 1/1974 | Dunlavy | |
| 3,947,644 A * | 3/1976 | Uchikawa | 310/332 |
| 4,250,415 A | 2/1981 | Lewiner et al. | |
| 6,427,017 B1 * | 7/2002 | Toki | 381/190 |
| 6,785,393 B2 * | 8/2004 | Lipponen et al. | 381/191 |
| 7,388,619 B2 * | 6/2008 | Eaton et al. | 348/552 |
| 7,527,375 B2 | 5/2009 | Blum et al. | |
| 7,760,898 B2 | 7/2010 | Howell et al. | |
| 7,971,994 B2 | 7/2011 | Blum et al. | |
| 7,995,777 B2 | 8/2011 | Yu et al. | |
| 2010/0110368 A1 | 5/2010 | Chaum | |
| 2010/0224437 A1 * | 9/2010 | Booth et al. | 181/166 |
| 2011/0182443 A1 * | 7/2011 | Gant | 381/114 |
| 2012/0047953 A1 * | 3/2012 | Feng et al. | 65/102 |
| 2012/0165597 A1 * | 6/2012 | Proulx et al. | 600/25 |

FOREIGN PATENT DOCUMENTS

| | | |
|---|---|---|
| WO | WO02/48659 | 6/2002 |
| WO | WO2009/156145 | 12/2009 |
| WO | WO2011/130374 | 10/2011 |

OTHER PUBLICATIONS

Lo, et al., Parylene-based electret power generators; Department of Electrical Engineering, J. Micromech. Microeng. vol. 18; 2008; pp. 1-8.

* cited by examiner

*Primary Examiner* — Brenda Bernardi
(74) *Attorney, Agent, or Firm* — Dunlap Codding, P.C.

(57) ABSTRACT

A transparent lens microphone comprises (a) a refractive lens; (b) a sound sensitive coating on an outer surface of the refractive lens; and (c) electrical contacts connected to the sound sensitive coating so as to provide an electrical analog signal representative of an acoustic signal striking the outer surface of the transparent lens microphone.

21 Claims, 5 Drawing Sheets

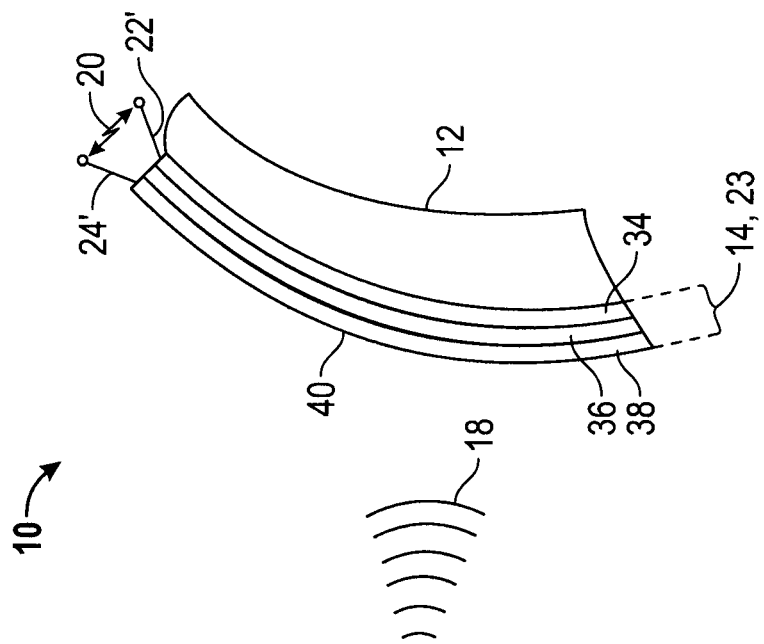
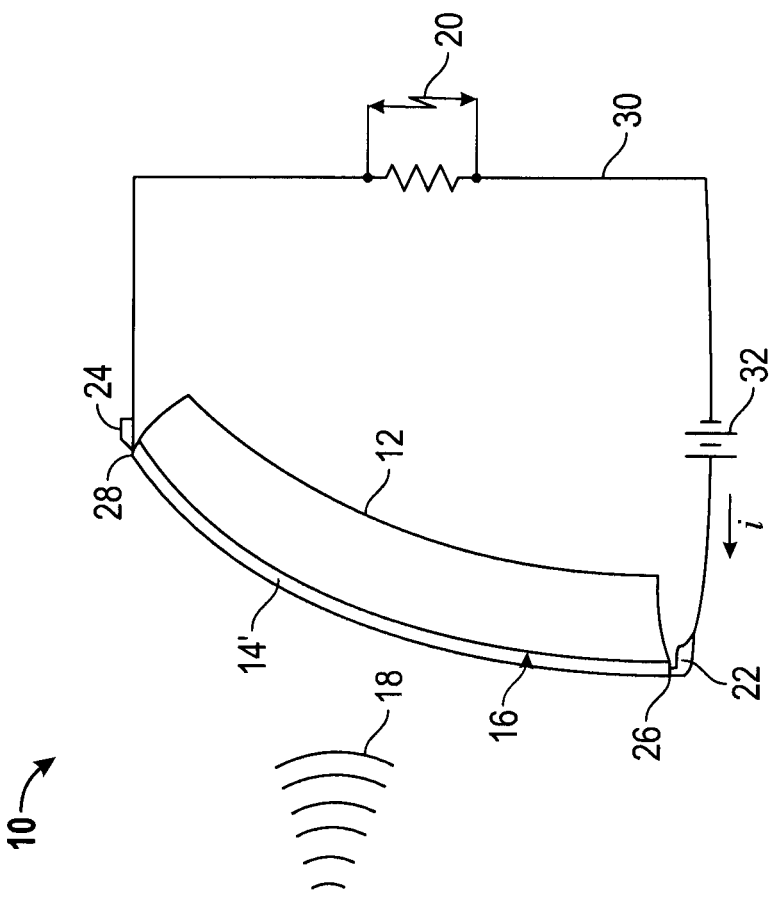

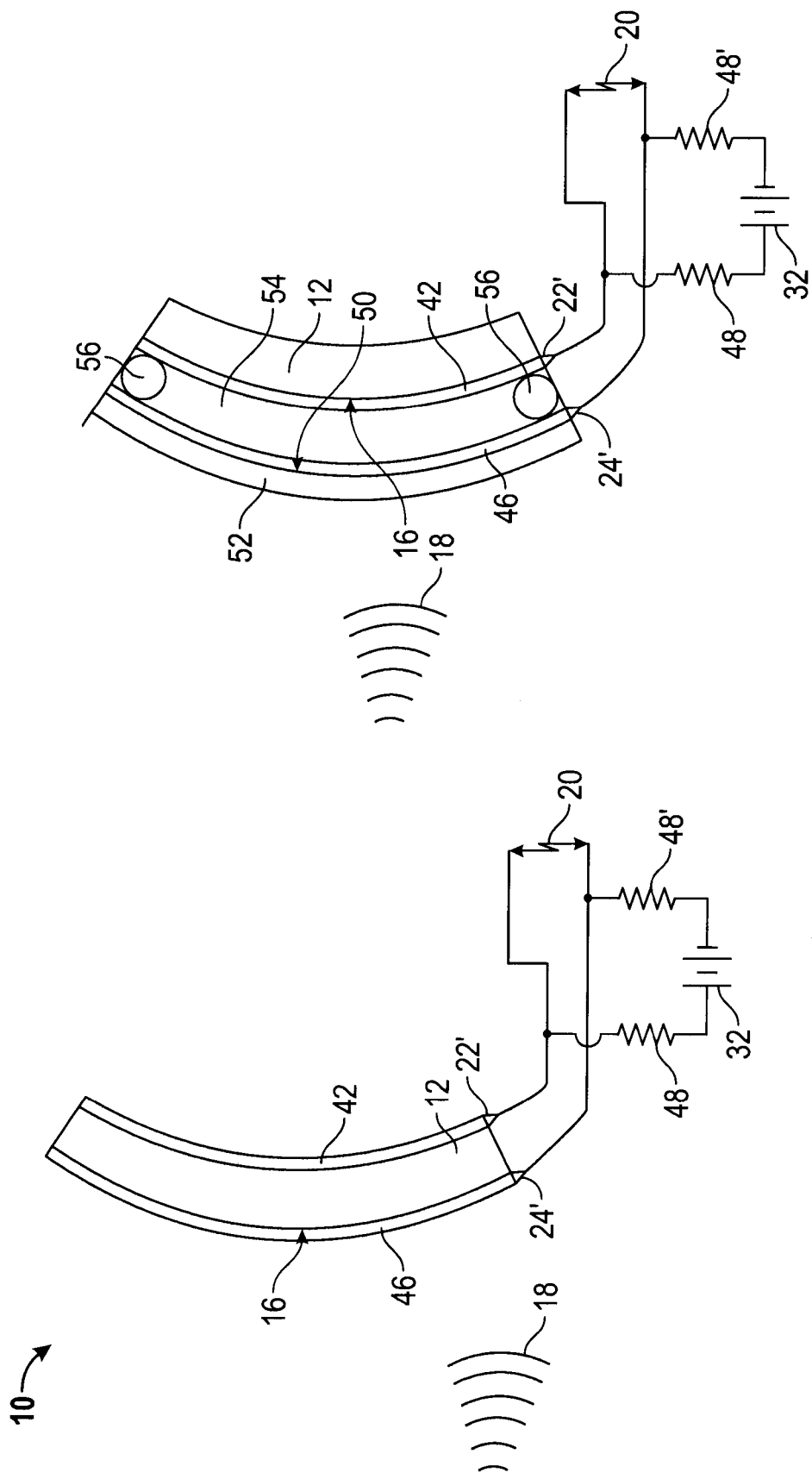

TRANSPARENT LENS MICROPHONE

INCORPORATION BY REFERENCE TO RELATED APPLICATIONS

The entirety of the following patent applications are hereby expressly incorporated herein by reference: U.S. Provisional Patent Application Ser. No. 61/600,236 filed Feb. 17, 2012; and U.S. Provisional Patent Application Ser. No. 61/624,585 filed Apr. 16, 2012.

BACKGROUND OF THE INVENTIVE CONCEPTS

1. Field of the Inventive Concepts

The inventive concepts disclosed and claimed herein relate generally to a microphone for hearing aids, and more particularly, but not by way of limitation, to a refractive lens coated to generate an electrical analog of an acoustic signal striking an outer surface of the refractive lens.

2. Brief Description of the Prior Art

Hearing aids are electroacoustic devices used to amplify or modify sound for the user. They are typically worn in or behind the ear and include a microphone, an amplifier and a speaker. The microphone receives sound waves and converts the sound to electrical signals. The electrical signals can then be amplified or otherwise processed to amplify certain frequencies while reducing or cancelling others. The amplified/processed electrical signals are then converted back to sound waves which are transmitted to an ear canal and/or the ear drum of the user. Other hearing aid devices transmit the amplified/processed electrical signals to a transducer that converts the signals into mechanical vibrations directly on the tympanic members of the middle ear. Bone anchored hearing aids (BAHA) bypass the outer and middle ear and vibrate the skull and inner ear directly.

Regardless of the final delivery means, all hearing aids require a microphone. Due to problems associated with hearing aid size and weight, and for cosmetic reasons, much effort has been expended to decrease the size of these microphones. However, there is generally a tradeoff between size and performance. For example, to improve directional hearing, constructions often make use of multiple microphones which can become quite noticeable and possibly cumbersome. There is a need for improved microphone designs for hearing aids that are cosmetically desirable and provide improved performance.

SUMMARY OF THE INVENTION

A transparent lens microphone comprises (a) a refractive lens; (b) a sound sensitive coating on an outer surface of the refractive lens; and (c) electrical contacts connected to the sound sensitive coating so as to provide an electrical analog signal representative of an acoustic signal striking the outer surface of the transparent lens microphone.

BRIEF DESCRIPTION OF THE DRAWINGS

Like reference numerals in the figures represent and refer to the same or similar element or function. Implementations of the disclosure may be better understood when consideration is given to the following detailed description thereof. Such description makes reference to the annexed pictorial illustrations, schematics, graphs, and drawings. The figures are not necessarily to scale and certain features and certain views of the figures may be shown exaggerated, to scale or in schematic in the interest of clarity and conciseness. In the drawings:

FIG. 2 is a schematic representation of a piezoresistive embodiment of a transparent lens microphone constructed in accordance with the inventive concepts disclosed herein.

FIG. 3 is a schematic representation of a piezoelectric embodiment of a transparent lens microphone constructed in accordance with the inventive concepts disclosed herein.

FIG. 4 is a schematic representation of another embodiment of a transparent lens microphone constructed in accordance with the inventive concepts disclosed herein.

FIG. 5A is a schematic representation of yet another embodiment of a transparent lens microphone constructed in accordance with the inventive concepts disclosed herein.

DETAILED DESCRIPTION OF EXEMPLARY EMBODIMENTS

Figure 1:
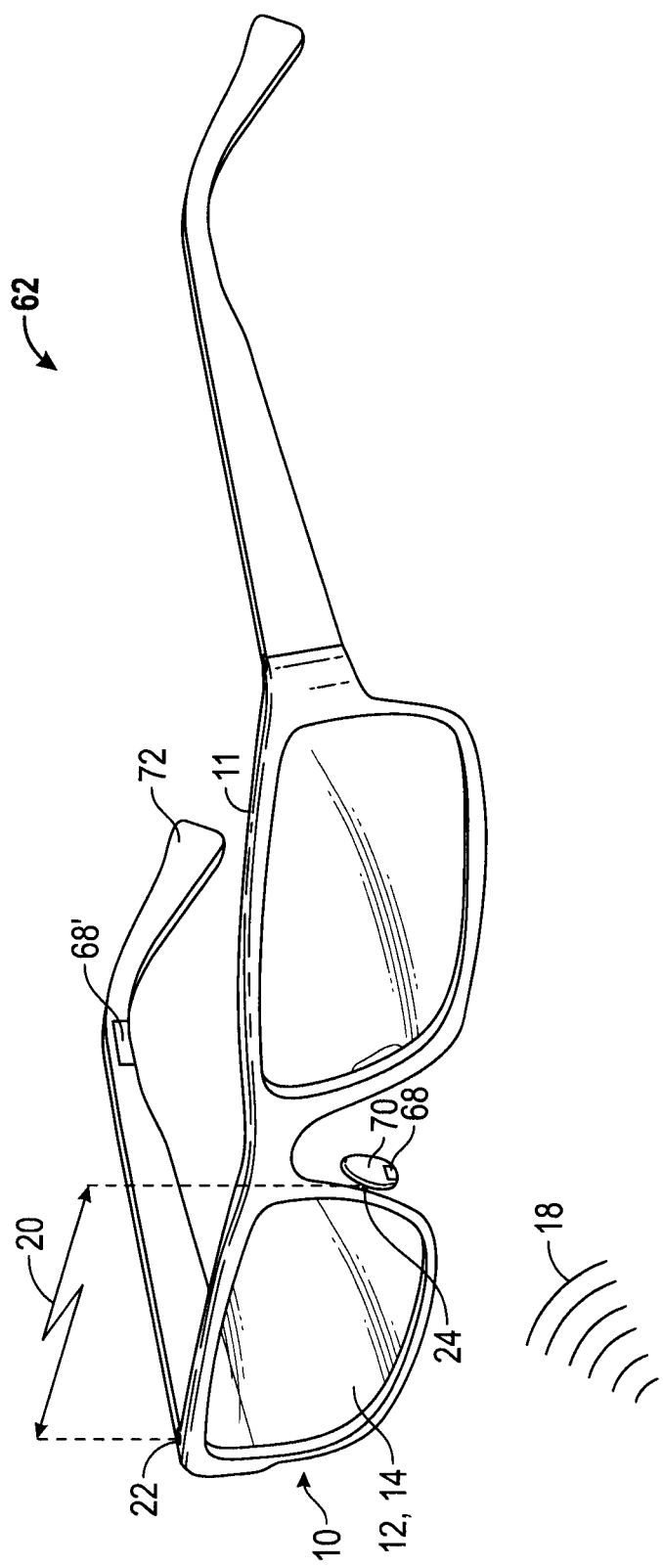
FIG. 1 is a schematic representation of an embodiment of a transparent lens microphone used in accordance with the inventive concepts disclosed herein.

Before explaining at least one embodiment of the inventive concepts disclosed herein in detail, it is to be understood that the inventive concepts are not limited in their application to the details of construction, experiments, exemplary data, and/or the arrangement of the components set forth in the following description, or illustrated in the drawings. The presently disclosed and claimed inventive concepts are capable of other embodiments or of being practiced or carried out in various ways. Also, it is to be understood that the phraseology and terminology employed herein is for purpose of description only and should not be regarded as limiting in any way.

In the following detailed description of embodiments of the inventive concepts, numerous specific details are set forth in order to provide a more thorough understanding of the inventive concepts. However, it will be apparent to one of ordinary skill in the art that the inventive concepts within the disclosure may be practiced without these specific details. In other instances, well-known features have not been described in detail to avoid unnecessarily complicating the instant disclosure.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or at least one and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Hearing aids traditionally have not provided sufficient directional selectivity. To enable a person to hear clearly in a noisy environment, one must selectively favor sound in front of the person rather than from all directions. This allows the person to listen in the direction he or she is looking. Recently, a new type of eyeglass aid was introduced utilizing multiple microphones on each side of the eyeglass frame. By using two microphones on each side, and amplifying the sound coming from the front microphones, the user can discern between sound coming from the front and sound coming from the sides or back. Phase and intensity can be used in processing the signals to improve the signal-to-noise ratio for that sound. Unfortunately, the technology is limited by the small size of the microphones required in order to be fitted into the frame of the glasses.

The presently disclosed inventive concept(s) overcomes this limitation by utilizing the surfaces of refractive lenses such as, for example, the eyeglass lenses as microphones. Acoustic energy is transmitted basically from point sources, and the intercepted power of this energy is a direct function of the area of the receiver facing the oncoming sound wave. Refractive lenses and the lenses of eyewear, when used as acoustic receivers, present a much larger area to the sound source compared to the small microphones traditionally used in hearing aids.

Referring now to the drawings, and more particularly to FIG. 1 and FIG. 2, shown therein is an exemplary embodiment of a transparent lens microphone 10 constructed in accordance with the inventive concepts disclosed and claimed herein. The transparent lens microphone 10, shown positioned in an eyeglass frame 11, comprises a refractive lens 12 having a sound-sensitive coating 14 on an outer surface 16 of the refractive lens 12. The sound-sensitive coating 14 is excitable by acoustic energy, referred to herein as the acoustic signal 18, which impinges/strikes the sound-sensitive coating 14 on the outer surface 16 of the refractive lens 12, and causes a corresponding electrical analog signal 20 that is an analog of the acoustic signal 18. This analog signal 20 may be further amplified or processed, before or after communicating to any number of devices including earpieces, hearing aids, smartphones, and the like. Such communication may be wired or in form of radio frequency, Wi-Fi, Bluetooth, magnetic loop, infra red, ultrasonic and the like.

The refractive lens 12 is typically an eyeglass lens or corrective lens designed to correct a user's vision. However, it is not necessary that the refractive lens 12 be an eyeglass lens or that the eyeglass lens provide corrected vision. Nonlimiting examples of the refractive lens 12 include a gun scope, a telescopic site, a lens in binoculars, as well as eyeglasses. Additionally, the refractive lens 12 can be tinted as in sunglasses, or provided with a variable tint as in transition lenses, with or without vision correction. Additional coatings, such as anti-reflective, scratch-resistant, anti-fog, and UV protective coatings can also be present on the transparent lens microphone 10.

In the embodiment shown in FIG. 2, a piezoresistive sound-sensitive coating 14' is provided. A first electrical contact 22 and a second electrical contact 24 connect a first edge 26 and a second edge 28 of the piezoresistive sound-sensitive coating 14', thereby creating an electrical circuit 30. Positioning of the first and second electrical contacts 22 and 24, respectively, is quite flexible. In the embodiment shown in FIG. 1, the first electrical contact 22 is positioned adjacent a temple of the eyeglass frame 11 and the second electrical contact 24 positioned adjacent or in a nosepiece of eyeglass frame 11. A power source 32 is added to provide a direct current (DC) voltage to the electrical circuit 30. Stress changes in the piezoresistive sound-sensitive coating 14' caused by contact with the acoustic signal 18, create corresponding changes in the electrical resistance across the piezoresistive sound-sensitive coating 14'. These changes in electrical resistance result in a current flow that is modulated by the changing resistance at a frequency of the acoustic signal 18, thereby providing the electrical analog signal 20 that is an electrical analog of the acoustic pressure wave or acoustic signal 18 striking the transparent lens microphone 10. The electrical analog signal 20 can be amplified and/or processed to digital or analog form and further compensated to accommodate the individual hearing characteristics of the intended wearer.

Piezoresistive materials are those that change electrical resistance with mechanical stress and include semiconductors wherein changes in inter-atomic spacing resulting from strain affects the bandgaps, changing the energy required for electrons to be raised into the conduction band, and resulting in a change in resistivity of the semiconductor. Nonlimiting examples of semiconductor piezoresistive materials include germanium, polycrystalline silicon, amorphous silicon, single crystal silicon. In one embodiment, the piezoresistive sound-sensitive coating 14' comprises a transparent polycrystalline silicon. Other suitable piezoresistive materials include overlapping carbon nanotubes and overlapping submicron graphene crystallites. The nanotubes and graphene crystallites can be too small to reflect visible light, and thus appear transparent.

An embodiment shown in FIG. 3 shows the transparent lens microphone 10 comprising a sound-sensitive coating 14 having two or more piezoelectric layers 23 such as a first, second and third layer, 34, 36 and 38, respectively, producing a piezoelectric effect. Piezoelectric materials generate a charge separation and voltage when deformed by mechanical pressure. Materials showing a piezoelectric effect are known to those skilled in the art and include quartz, Rochelle salt, and certain ceramics such as tin oxides, various titanium oxides, barium titanate and zinc oxide. In one embodiment, the two or more piezoelectric layers 23 comprise nanotubes and/or nanostructures to create the piezoelectric effect while substantially maintaining transparency. Numerous types of piezoelectric thin films have been adapted for strain sensing and are well known to those skilled in the art. For example, piezoelectric pickups are used for acoustic-electric guitars, and piezoelectric transducers are used to detect the impact of a drummer's sticks in electronic drum pads, and to detect muscle movements in medical acceleromyography. Utilizing the two or more piezoelectric layers 23, along with the first and second electrical contacts 22' and 24', respectively, connected to at least two of the layers, for example to the first layer 34 and the third layer 38 of the sound-sensitive coating 14, an electrical analog signal 20 is produced as a voltage representing the acoustic signal 18 striking/impinging on the front side 40 of the transparent lens microphone 10. The electrical analog signal 20 may then be amplified, processed, encoded and selectively modified to compensate for appropriate hearing characteristics of the user.

In one embodiment, the sound-sensitive coating 14 is designed to provide additional desired features to the user. For example, use of nanotubes in the two or more piezoelectric layers 23 can provide high strength and hardness as well as piezoelectric action, and thereby augment or replace the protective coating often used for corrective lenses to reduce scratching and other optical deformities.

In an embodiment shown in FIG. 4, the transparent lens microphone 10 comprises the refractive lens 12 having an inner conductive coating 42 on an inner surface 44 of the refractive lens 12, and an outer conductive coating 46 on the outer surface 16 of the refractive lens 12. The inner and outer conductive coatings 42 and 46, respectively, act as plates of a parallel plate capacitor with the refractive lens 12 acting as a dielectric. The acoustic signal 18 causes a slight deformation of the transparent lens microphone 10 at an audio rate, which alters the space between the inner and outer conductive coatings 42 and 46, respectively, also at the audio rate. The inner and outer conductive coatings 42 and 46, respectively, act as parallel capacitor plates and are supplied with a DC charge using the power source 32 supplied through biasing resistors 48 and 48' such that the change in the capacitance, which occurs at the audio rate, causes a change in the electrical analog signal 20 (the terminal voltage of the parallel plate capacitor). Note that since the terminal voltage of such a parallel plate capacitor also changes at the audio rate, the terminal voltage provides the electrical analog of the received acoustic signal 18. Thus the electrical analog signal 20 comprises an AC signal "riding on" the DC, and can be selectively removed and amplified using procedures and equipment known to those skilled in the art.

In one embodiment, the material used for the inner and outer conductive coatings 42 and 46, respectively, is an indium tin oxide (ITO) which provides both electrical conductivity and optical transparency. Thin films of ITO are commonly deposited on surfaces by physical vapor deposition. In another embodiment, the transparent conductive coating material is aluminum-doped zinc oxide (AZO). Other nonlimiting examples of suitable conductive coating materials include aluminum oxide (which is also used for scratch resistance), tin antimony oxide, titanium oxide, and metals such as silver, gold, aluminum, chrome, rhodium and copper. In yet another embodiment, overlapping conductive nanostructures such as carbon nanotubes provide the transparent conductive coating.

Referring to FIG. 5A, one embodiment utilizing inner and outer conductive coatings 42 and 46, respectively, positions the inner conductive coating 42 on the outer surface 16 of the refractive lens 12, and the outer conductive coating 46 on an inner surface 50 of a second lens 52. The second lens 52 is supported by the refractive lens 12 in a sandwich or parallel fashion with the inner and outer conductive coatings 42 and 46, respectively, proximate each other and separated by a cavity 54. The cavity 54 is maintained by a perimeter seal 56, such as a gasket or an O-ring.

In one embodiment the cavity 54 maintains a vacuum. In another embodiment the cavity 54 maintains a pressure between a vacuum and atmospheric pressure using air or another gas compatible with the transparent lens microphone materials. The inner and outer conductive coatings 42 and 46, respectively, act as plates of a parallel plate capacitor with the gas filled cavity 54 acting as a dielectric. As described above, the acoustic signal 18 causes a slight deformation of the transparent lens microphone 10 at an audio rate, which alters the spacing between the inner and outer conductive coatings 42 and 46, respectively, at the audio rate. As previously described in connection with FIG. 4, by utilizing a DC power source 32 supplied through biasing resistors 48 and 48', the change in the capacitance resulting from the change in the spacing, causes a corresponding change in the electrical analog signal 20.

In one embodiment, the cavity 54 is filled with a compliant dielectric material such as a water saturated layer of polymer such as a silicon based polymer similar to a contact lens. The hydration of the polymer is maintained by the perimeter seal 56. Other nonlimiting examples of suitable compliant dielectric materials include silicon-based gels, elastomers, and foams. Examples of suitable silicon-based compounds include siloxanes such as methylvinylsilicone and methylvinylphenylsilicone.

Figure 5D:
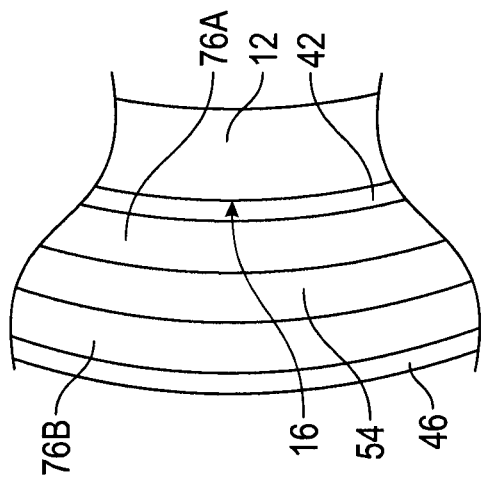
FIG. 5D is yet another schematic representation of an electret embodiment of a transparent lens microphone constructed in accordance with the inventive concepts disclosed herein.
Figure 5C:
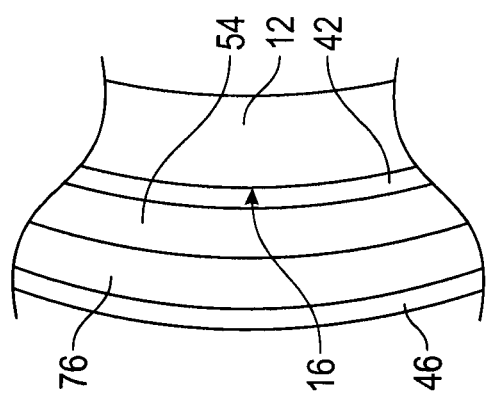
FIG. 5C is another schematic representation of an electret embodiment of a transparent lens microphone constructed in accordance with the inventive concepts disclosed herein.
Figure 5B:
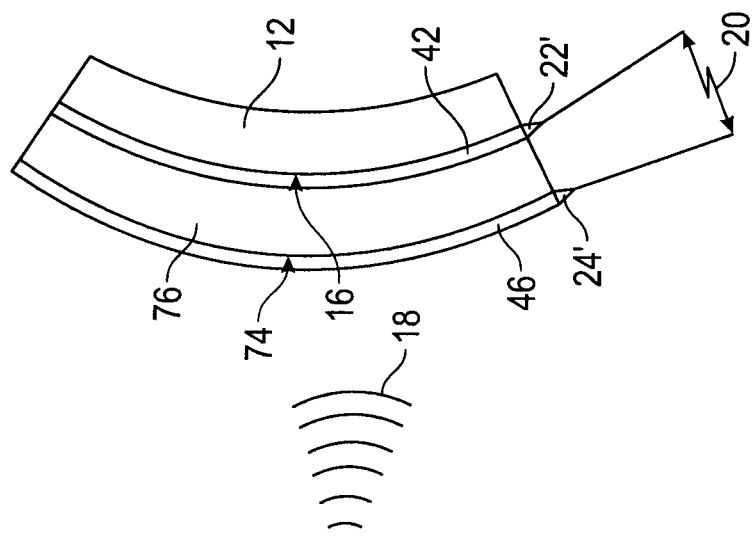
FIG. 5B is a schematic representation of an electret embodiment of a transparent lens microphone constructed in accordance with the inventive concepts disclosed herein.

Referring to FIG. 5B, an embodiment utilizing inner and outer conductive coatings 42 and 46, respectively, positions the inner conductive coating 42 on the outer surface 16 of the refractive lens 12, and positions the outer conductive coating 46 on an outer surface 74 of an electret layer 76. The electret layer 76 is then sandwiched between the inner conductive coating 42 and the outer conductive coating 46. Examples of suitable conductive coating materials are as previously described. Some lens materials require smoothing before a coating is applied. This can be accomplished using a transparent coating to fill microscopic "valleys" prior to coating with a conductive, dielectric, or other material.

An electret is a stable dielectric material with a permanently embedded static electric charge. Due to the high resistance and chemical stability of the material, the static charge will not decay for perhaps hundreds of years. Electret materials are common in nature; however, most commercial electrets are made from synthetic polymers such as fluoropolymers, polypropylene, polyethyleneterephthalate and the like. In one embodiment, the electret is a poly(p-xylylene) polymer such as Parylene™ is used. Parylene™ is a trade name for a variety of poly(p-xylylene) polymers known for both high dielectric strength and the ability to provide a protective layer that conforms to surfaces having crevices, edges, and the like.

In another embodiment, the electret layer 76 comprises a transparent polymeric material such as a fluorinated polymer. Examples of suitable fluorinated polymer electret materials include, but are not limited to, polytetrafluoroethylene (PTFE), hexafluoropropylene (FEP), and copolymers of PTFE and FEP and the like. For example, TEFLON® AF, manufactured by I. E. DuPont de Nemours and Company, is an amorphous copolymer of tetrafluoroethylene and 2,2-bis-trifluoromethyl-4,5-difluoro-1,3 dioxole (PDD). TEFLON® AF offers excellent optical properties such as optical clarity and light transmission. It can be applied in liquid form, thus facilitating thin film coating.

An advantage of using an electret material for the transparent lens microphone 10 is that the electret does not require a power source 32 to maintain polarization. The electret can be charged using corona discharge and a variety of other methods known to those skilled in the art. "Real-charge" electrets contain an excess charge of one or both polarities either on the surfaces of a dielectric or within the bulk of the dielectric. "Oriented-dipole" electrets contain oriented or aligned dipoles. In one embodiment, the electret material is charged to retain charge for the life of the product. In another embodiment, the electret material is only partially charged or is provided without a charge and can be charged later.

Numerous configurations of a transparent lens microphone 10 utilizing an electret can be utilized. Referring now to FIG. 5C, one embodiment utilizes an electret layer 76 in combination with a compliant dielectric elastomeric material within the cavity 54. Suitable compliant dielectric elastomeric materials include a water saturated layer of polymer such as a silicon based polymer similar to a contact lens as described above. Other nonlimiting examples of suitable compliant dielectric materials include silicon-based gels, elastomers, and foams.

Yet another configuration is shown in FIG. 5D wherein the elastomer-filled cavity 54 is sandwiched between an inner and an outer electret layer, 76A and 76B, respectively. The elastomer-filled cavity 54 and the inner and outer electret layers, 76A and 76B, are collectively sandwiched between the inner conductive coating 42 and the outer conductive coating 46. The inner conductive coating 42 is positioned on the outer surface 16 of the refractive lens 12.

Figure 6:
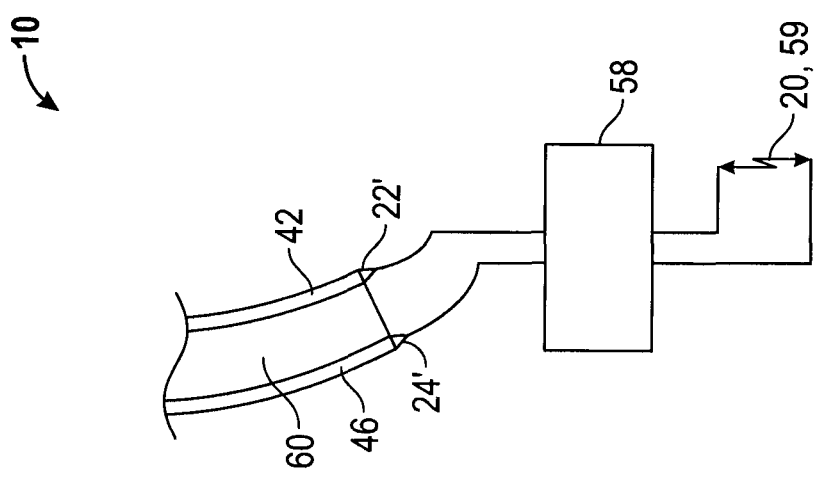
FIG. 6 is a schematic representation of a radio frequency FM embodiment of a transparent lens microphone constructed in accordance with the inventive concepts disclosed herein.

Another embodiment that eliminates the DC power source 32, makes use of the change in the capacitance resulting from the change in the spacing. The change in capacitance can be conducted through first and second electrical contacts 22' and 24', respectively, to a radio frequency oscillatory circuit 58 as shown in FIG. 6. The inner conductive coating 42 and outer conductive coating 46 are shown separated by a dielectric layer 60 forming any capacitor-type configuration including the cavity 54 as in FIG. 5 and the refractive lens 12 as in FIG. 4. In this manner, the transparent lens microphone 10 can provide a frequency control element in the radio frequency oscillatory circuit 58 which changes frequency at the audio rate of the acoustic signal 18 striking the transparent lens microphone 10.

While other methods can be used, in one exemplary embodiment a radio frequency oscillatory circuit 58 having a center frequency of 10.7 MHz can be modulated at audio rates of 50 Hz to 10 KHz with an amplitude dynamic range of 40 db to 110 db pressure wave intensity. The frequency modulated signal 59 resulting from these inputs may be demodulated to recover the replica of the acoustic signal 18 by a frequency counter (not shown) which is gated to sample the composite frequency modulated radio frequency (RF) signal at a rate of sampling sufficiently high to allow the sampled gated bursts of RF to be treated as digital words describing the acoustic signal 18. This allows a subsequent digital to analog conversion and recovery of the electrical analog of the acoustic signal 18 which can be further amplified, processed and compensated to compliment the wearer/hearer needs. In this example the frequency of the 10.7 MHZ center frequency is chosen as a common intermediate frequency used in available FM broadcast receivers. Thus miniature components for the circuitry are readily available in both traditional frequency discriminator form and in gated pulse counter form. Digital words captured by the gated counter may be processed in digital form to compensate for the needs of the hearer/wearer, or this compensation may take place after the digital words are used to produce the electrical analog of the acoustic signal 18.

Figure 7:
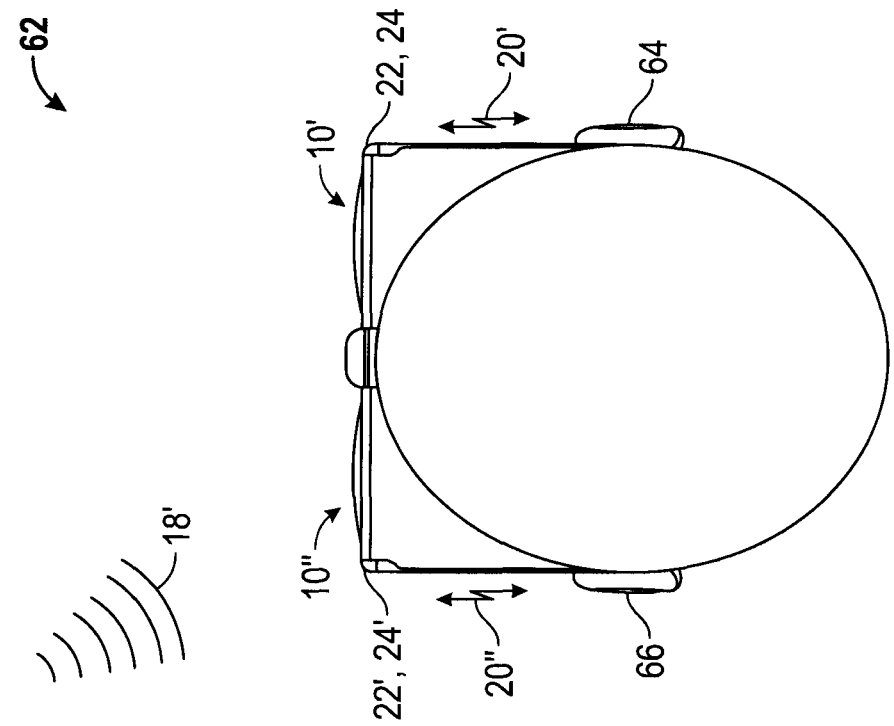
FIG. 7 is a schematic of a hearing enhancement system constructed in accordance with the inventive concepts disclosed herein.

It is often desirable to have a hearing enhancement system 62 that is both stereophonic and directional. This can enhance the user's ability to listen to the sounds that she or he faces with a minimum of background interference, while at the same time enhancing the user's ability to locate the direction of the sound. The human brain is able to detect slight differences in the arrival time of acoustic signals to the ears. This directional quality of hearing can also be provided using a pair of transparent lens microphones 10 in a standard eyeglass frame. Referring to FIG. 1 and FIG. 7, the acoustic/transducer qualities of a pair of the transparent lens microphones, such as right transparent lens microphone 10' and left transparent lens microphone 10", can be stereophonic, providing two electrical analog signals 20' and 20" which can each be modified for the user's hearing abilities.

It can also be seen from FIG. 7 that acoustic signal 18' reaches the left transparent lens microphone 10" before it reaches the right transparent lens microphone 10'. Transmission of the acoustic signal 18' as received by the right transparent lens microphone 10' to the right ear 64 of the user, and transmission of the acoustic signal 18' as received by the left transparent lens microphone 10" to the left ear 66 of the user, after modification to compensate for the user's hearing impairment, can reflect the actual differences in the timing and volume of the sound reaching the right and left transparent lens microphones 10' and 10", respectively, and can thereby provide the user with a directional component for the perceived sound.

It is understood that interconnection, amplification, processing and retransmission of the electrical analog signal(s) 20 from the transparent lens microphone 10 (or lenses) can use methods and devices known to those skilled in the art. Retransmission of the electrical analog signal(s) 20 can utilize WiFi, Bluetooth, magnetic loop, infra red, ultra sonic, and the like to deliver to various receiving devices including, but not limited to, earpieces, hearing aids and smart phones. In one embodiment, and as shown in FIG. 1, the electrical analog signal 20 from the transparent lens microphone 10 is processed by, and wirelessly transmitted from, converter/processor electronics 68 and/or 68' housed within a nose piece 70 or a temple piece 72 of the eyeglass frame 11. The converter/processor electronics 68 are understood by those skilled in the art. The converter/processor electronics 68, as well as the receiving devices, can include speech recognition, speech to text conversion, and/or call conferencing technology, and may require application software.

From the above description, it is clear that the inventive concept(s) disclosed herein is well adapted to carry out the objects and to attain the advantages mentioned herein as well as those inherent in the inventive concept disclosed herein. While exemplary embodiments of the inventive concept disclosed herein have been described for purposes of this disclosure, it will be understood that numerous changes may be made which will readily suggest themselves to those skilled in the art and which are accomplished without departing from the scope of the inventive concept disclosed herein and defined by the appended claims.

What is claimed is:

1. A transparent lens microphone, comprising: (a) a refractive eyeglass lens; (b) a sound sensitive coating on a surface of the refractive eyeglass lens; and (c) electrical contacts connected to the sound sensitive coating so as to provide an electrical signal analogous to an acoustic signal striking the transparent lens microphone.

2. A transparent lens microphone, comprising: (a) a refractive lens; (b) a sound sensitive coating on a surface of the refractive lens; and (c) electrical contacts connected to the sound sensitive coating so as to provide an electrical signal analogous to an acoustic signal striking the transparent lens microphone, wherein the refractive lens is a corrective eyeglass lens.

3. A transparent lens microphone, comprising: (a) a refractive lens; (b) a sound sensitive coating on a surface of the refractive lens; and (c) electrical contacts connected to the sound sensitive coating so as to provide an electrical signal analogous to an acoustic signal striking the transparent lens microphone, wherein the sound sensitive coating comprises a piezoresistive material.

4. A transparent lens microphone, comprising: (a) a refractive lens; (b) a sound sensitive coating on a surface of the refractive lens; and (c) electrical contacts connected to the sound sensitive coating so as to provide an electrical signal analogous to an acoustic signal striking the transparent lens microphone, wherein the sound sensitive coating comprises carbon nanotubes.

5. A transparent lens microphone, comprising: (a) a refractive lens; (b) a sound sensitive coating on a surface of the refractive lens; and (c) electrical contacts connected to the sound sensitive coating so as to provide an electrical signal analogous to an acoustic signal striking the transparent lens microphone, wherein the sound sensitive coating comprises two or more piezoelectric layers.

6. A transparent lens microphone, comprising: (a) a refractive lens; (b) a sound sensitive coating on a surface of the refractive lens; and (c) electrical contacts connected to the sound sensitive coating so as to provide an electrical signal analogous to an acoustic signal striking the transparent lens microphone, wherein the sound sensitive coating comprises an inner conductive coating on an inner surface of the refractive lens and an outer conductive coating on an outer surface of the refractive lens.

7. A transparent lens microphone, comprising: (a) a refractive lens; (b) a sound sensitive coating on a surface of the refractive lens; and (c) electrical contacts connected to the sound sensitive coating so as to provide an electrical signal analogous to an acoustic signal striking the transparent lens microphone, wherein the sound sensitive coating comprises: (a) an inner conductive coating on an outer surface of the refractive lens; and (b) an outer conductive coating on an inner surface of a second lens, wherein the second lens is supported by the refractive lens with the inner and outer conductive coatings proximate each other and separated by a cavity.

8. The transparent lens microphone of claim 7, further comprising a perimeter seal maintaining contents within the cavity.

9. The transparent lens microphone of claim 8, wherein the perimeter seal maintains a pressure or a vacuum within the cavity.

10. The transparent lens microphone of claim 8, wherein the cavity contains a gas.

11. The transparent lens microphone of claim 8, wherein the cavity contains a water saturated polymer.

12. A transparent lens microphone, comprising: (a) a refractive lens; (b) a sound sensitive coating on a surface of the refractive lens; and (c) electrical contacts connected to the sound sensitive coating so as to provide an electrical signal analogous to an acoustic signal striking the transparent lens microphone, wherein the sound sensitive coating comprises: an inner conductive coating on an outer surface of the refractive lens; an electret layer adjacent the inner conductive coating, the electret layer having an outer surface; and an outer conductive coating on the outer surface of the electret layer, such that the electret layer is sandwiched between the inner conductive coating and the outer conductive coating.

13. The transparent lens microphone of claim 12, wherein the inner and outer conductive coatings comprise a material selected from indium tin oxide (ITO), aluminum-doped zinc oxide (AZO), aluminum oxide, tin antimony oxide, titanium oxide, carbon nanotubes, and metals such as silver, gold, aluminum, chrome, rhodium and copper.

14. The transparent lens microphone of claim 12, wherein the inner and outer conductive coatings comprise indium tin oxide (ITO).

15. The transparent lens microphone of claim 12, wherein the electret layer comprises a material selected from fluoropolymers, polypropylene, polyethyleneterephthalate, and poly(p-xylylene).

16. The transparent lens microphone of claim 12, wherein the electret layer comprises a poly(p-xylylene).

17. The transparent lens microphone of claim 12, wherein the electret layer is charged.

18. The transparent lens microphone of claim 12, wherein the electret layer is uncharged.

19. The transparent lens microphone of claim 1, further comprising a DC power source.

20. A transparent lens microphone, comprising: (a) a refractive lens; (b) a sound sensitive coating on a surface of the refractive lens; and (c) electrical contacts connected to the sound sensitive coating so as to provide an electrical signal analogous to an acoustic signal striking the transparent lens microphone, and further comprising a radio frequency oscillatory circuit.

21. The transparent lens microphone of claim 2, further comprising converter/processing electronics housed in a temple pad or a nose pad such that the converter/processing electronics are in communication with the electrical contacts when the corrective eyeglass lens and the temple pad or nose pad are positioned on an eyeglass frame.

* * * * *